US012755014B2

(12) United States Patent
Kumar et al.

(10) Patent No.: US 12,755,014 B2
(45) Date of Patent: Oct. 6, 2026

(54) SYSTEM AND METHOD FOR DETECTION OF MALWARE OR RANSOMWARE USING ENTROPY QUANTIFICATION

(71) Applicant: THALES DIS CPL USA, INC., Austin, TX (US)

(72) Inventors: Sharvan Kumar, Delhi (IN); Stephane Duhamel, Santa Cruz, CA (US)

(73) Assignee: THALES DIS CPL USA, INC., Austin, TX (US)

( * ) Notice: Subject to any disclaimer, the term of this patent is extended or adjusted under 35 U.S.C. 154(b) by 155 days.

(21) Appl. No.: 18/626,423

(22) Filed: Apr. 4, 2024

(65) Prior Publication Data

US 2025/0315526 A1 Oct. 9, 2025

(51) Int. Cl.
*G06F 21/56* (2013.01)

(52) U.S. Cl.
CPC .................................. *G06F 21/565* (2013.01)

(58) Field of Classification Search
CPC ..................................................... G06F 21/565
USPC ............................................................ 726/23
See application file for complete search history.

(56) References Cited

U.S. PATENT DOCUMENTS 10,027,694 B1 * 7/2018 Gupta ................. H04L 63/1458
11,036,561 B2 * 6/2021 Wray .................... H04L 43/106
2008/0184367 A1 7/2008 McMillan et al.
2009/0006438 A1 * 1/2009 Tunkelang ............ G06F 16/245 711/E12.024
2011/0246144 A1 * 10/2011 Tanaka .................. A61B 5/374 703/2
2018/0157834 A1 6/2018 Continella et al.
2019/0171823 A1 * 6/2019 Maluf ................... G06F 21/577
2019/0199736 A1 * 6/2019 Howard ............... G06N 3/0455
2021/0012002 A1 * 1/2021 Rosenthal ........... G06F 11/1435
2022/0138397 A1 * 5/2022 Han ...................... G06F 30/398 716/100
2022/0138931 A1 * 5/2022 Palma ..................... G06T 7/174 382/128

(Continued)

FOREIGN PATENT DOCUMENTS

KR 102000369 B1 7/2019
WO 2022225508 A1 10/2022

OTHER PUBLICATIONS

O'Shea, "An Introduction to Deep Learning for the Physical Layer", 2017, IEEE, pp. 1-12 (Year: 2017).*

(Continued)

*Primary Examiner* — Taghi T Arani
*Assistant Examiner* — Gregory A Lane

(57) ABSTRACT

A system or method for preventing or mitigating malicious processes in a computing environment having one or more processors and memory operatively coupled to the one or more processors can include computer instructions which when executed causes the one or more processors to perform certain operations. The operations can include the steps of obtaining all file system input and output paths using a kernel driver, performing a normalized entropy quantification calculation on data found on the file system input and output paths, determining an inverse density from the normalized entropy calculation, and flagging any data or data segment found having a difference in inverse densities of read and write volume equal to or higher than a predetermined threshold.

12 Claims, 6 Drawing Sheets

(56) References Cited

U.S. PATENT DOCUMENTS

| | | | | |
|---|---|---|---|---|
| 2022/0199235 | A1* | 6/2022 | Knickerbocker | G06Q 50/06 |
| 2023/0229773 | A1* | 7/2023 | Madden, Jr. | G06F 21/554<br>726/23 |
| 2024/0364712 | A1* | 10/2024 | Chandana | H04L 63/1433 |
| 2025/0097242 | A1* | 3/2025 | Zhao | H04L 63/102 |
| 2025/0315526 | A1* | 10/2025 | Kumar | G06N 20/00 |

OTHER PUBLICATIONS

Sandborn, “Reducing Malware Analysis Overhead With Coverings”, 2024, IEEE, pp. 4133-4144 (Year: 2024).*

International Search Report (PCT/ISA/210) and Written Opinion (PCT/ISA/237) mailed on Jul. 1, 2025 by the European Patent Office as the International Searching Authority for current International Application No. PCT/US2025/021428—[17 pages].

Beaman Craig et al: “Ransomware: Recent advances, analysis, challenges and future research directions”, Computers & Security. ,vol. 111, Dec. 1, 2021 (Dec. 1, 2021),pp. 1-22, XP055901222, NL ISSN: 0167-4048, DOI: 10.1016/j.cose.2021.102490; Facsimile p. 6.

Thales—CipherTrust Transparent Encryption—https://www.thalestct.com/wp-content/uploads/2022/09/ciphertrust-transparent-encryption-tct-pb.pdf.

Thales—CipherTrust Data Security Platform—https://cpl.thalesgroup.com/sites/default/files/content/product_briefs/field_document/2023-06/ciphertrust-data-security-platform-pb.pdf.

* cited by examiner

100

200

Frequency distribution of byte values on i/o data

300

Sorted frequency distribution of byte values on i/o data

302

Legend:
H: Height of the rectangle occupying same volume as the frequency curve
I: Number of bytes appearing at least once
Fn: Frequency of a given byte Cumulative Deviation
CD = Σ(H-Fn)

Mean Deviation:
MD = CD / I

Deviation percentage (inverse density):
DP = MD*100 / H

Histogram displaying how the entropy is calculated

350

400

SYSTEM AND METHOD FOR DETECTION OF MALWARE OR RANSOMWARE USING ENTROPY QUANTIFICATION

TECHNICAL FIELD

The present embodiments relate generally to systems and methods of detecting and preventing malicious processes. More particularly, the system and method relate to providing a system and method for detecting, preventing and mitigating malicious processing by analyzing data using at least entropy quantification.

BACKGROUND

Hacking vulnerabilities are discovered more often today. Cryptographic material, such as passwords, encryption keys, authentication information, and the like, may be cryptographically protected (e.g., encrypted) while being stored in non-volatile memory, for example, when the cryptographic material is not being used. To use the cryptographic material, the cryptographic material may be retrieved from the non-volatile memory, decrypted, and then stored in a volatile memory (e.g., a buffer, a cache, random access memory (RAM), etc.) in plaintext (e.g., unencrypted). The cryptographic material in the volatile memory may be used to perform cryptographic operations, such as authentication, encryption, authorization, signature generation, signature verification, etc.

However, the plaintext cryptographic material stored in the volatile memory continues to represent a vulnerability. In this regard, a malicious user (e.g., hacker) may use various tools to obtain the plaintext cryptographic material stored in the volatile memory. For example, the malicious user may gain access to a host and use tools to scan the volatile memory to obtain the plaintext cryptographic material. In another example, the malicious user may scan memory dumps and/or core dump files to retrieve the plaintext cryptographic material. In yet a further example, the malicious user may perform a cold boot attack to obtain the plaintext cryptographic material. Once the plaintext cryptographic material is obtained, the system may be compromised and the malicious user may obtain confidential and/or other secret information.

Another vulnerability has been the increasing use of ransomware. Ransomware accounts for 25% of all data breaches. Ransomware attacks can bring business operations to a grinding halt by blocking access to critical data until a ransom is paid. Ransomware is expected to strike businesses and individuals every 2 seconds by 2031.

Baseline security practices using perimeter controls such as next generation firewalls, secure email/web gateways and focusing on closing vulnerability gaps alone have not been sufficient to prevent ransomware attacks. The main challenge facing Fortune 500 companies is to safe guard business critical data from being encrypted by unauthorized processes and users on endpoints and servers.

One attempted solution inefficiently seeks for specific signatures or text within a file that creates many false positive hits. Another inefficient solution collects logs from the system and analyzes such logs to detect the malicious operations after being infected and unfortunately such a solution is usually too late at preventing serious damage intended by the perpetrator of the ransomware or other malicious code.

All of the subject matter discussed in this Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

SUMMARY

In some embodiments, a system for preventing or mitigating malicious processes in a computing environment can include one or more processors and memory operatively coupled to the one or more processors, where the memory includes computer instructions which when executed by the one or more processors causes the one or more processors to perform one or more operations. The operations can include obtaining all file system input and output paths using a kernel driver, performing a normalized entropy quantification calculation on data found on the file system input and output paths, determining an inverse density from the normalized quantification entropy calculation, and flagging any data found having a difference in inverse densities of read and write volume equal to or higher than a predetermined threshold.

In some embodiments, the normalized entropy quantification calculation can include the steps of separating the data into bins of each alphabet, arranging the bins in an ascending order of frequency, computing an area of a curve under a distribution of the data in the bins, and finding a height of an ideal distribution occupying the area to provide an ideal height. The normalized entropy quantification calculation can further include the steps of computing an absolute difference from the ideal height at each point on an X-axis, computing a cumulative deviation, computing a cumulative mean deviation, and computing a percentage of mean deviation by ideal height to provide the inverse density.

In some embodiments, the malicious processes can include ransomware or malware.

In some embodiments, the system for detecting further uses a machine learning system to refine the detecting of malicious processes. In some embodiments, the system for detecting further uses the machine learning system including parametrization of data, training with known benign programs and known malicious processes, and uses machine learning algorithms for prediction of run time behavior of a process to refine the detecting of malicious processes.

In some embodiments, the system for detecting maintains a running measure of a process's input/output behavior by maintaining the inverse density of reads and writes of data, maintaining a percentage of read by write volume to help reduce false positives, and maintaining a count of mutations.

In some embodiments, the system for detecting further computes ratios of inverse densities and input/output volumes, uses the computed ratios and the count of mutations as parametric inputs to the machine learning system.

In some embodiments, the system for detecting further trains the machine learning system with benign programs and malicious processes including simulated processes and real processes.

In some embodiments, the machine learning system marks a process as either suspect or benign.

In some embodiments, the machine learning system further accrues behavior corresponding to a process for a certain threshold and declares the process malicious upon crossing the threshold.

In some embodiments, a system for detecting and preventing or mitigating malicious processes in a computing environment can include one or more processors and memory operatively coupled to the one or more processors, wherein the memory includes computer instructions which when executed by the one or more processors causes the one or more processors to perform certain operations. The operations can include obtaining all file system input and output paths using a kernel driver, performing a normalized entropy quantification calculation on data found on the file system input and output paths, flagging any data found having a difference in inverse densities of read and write volume equal to or higher than a predetermined threshold. In some embodiments, the system can perform the normalized entropy quantification calculation on data found on the file system input and output paths by separating the data into bins of each alphabet, arranging the bins in an ascending order of frequency, computing an area of a curve under a distribution of the data in the bins, finding a height of an ideal distribution occupying the area to provide an ideal height, computing an absolute difference from the ideal height at each point on an X-axis, computing a cumulative deviation, computing a cumulative mean deviation, and computing a percentage of mean deviation by ideal height to provide an inverse density.

In some embodiments, a method for detecting and preventing or mitigating malicious processes in a computing environment using one or more processors and memory operatively coupled to the one or more processors, where the memory includes computer instructions which when executed by the one or more processors causes the one or more processors to perform certain operations or steps. The operations or steps can include obtaining all file system input and output paths using a kernel driver, performing a normalized entropy quantification calculation on data found on the file system input and output paths, determining an inverse density from the normalized entropy calculation, and flagging any data for data segment found having a difference in inverse densities of read and write volume equal to or higher than a predetermined threshold.

In some embodiments, the step of performing the normalized entropy calculation comprises the steps of separating the data into bins of each alphabet, arranging the bins in an ascending order of frequency, computing an area of a curve under a distribution of the data in the bins, finding a height of an ideal distribution occupying the area to provide an ideal height, computing an absolute difference from the ideal height at each point on an X-axis, computing a cumulative deviation, computing a cumulative mean deviation, and computing a percentage mean deviation by ideal height to provide the inverse density.

In some embodiments, the method further uses a machine learning system for parametrization of data, training with known benign programs and known malicious processes, and uses machine learning algorithms for prediction of run time behavior of a process to refine the detecting of malicious processes.

In some embodiments, the method can further include the step of performing one or more of a signature-based comparison and reverse engineering analysis in addition to the machine learning.

BRIEF DESCRIPTION OF THE DRAWINGS

The accompanying drawings, which are incorporated in and constitute a part of this description, illustrate embodiments consistent with the embodiments and, together with the description, serve to explain the principles of the embodiments.

Specific embodiments have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the embodiments. Instead, they are merely examples of systems, apparatuses and methods consistent with aspects related to the embodiments as recited in the appended claims.

Figure 1:
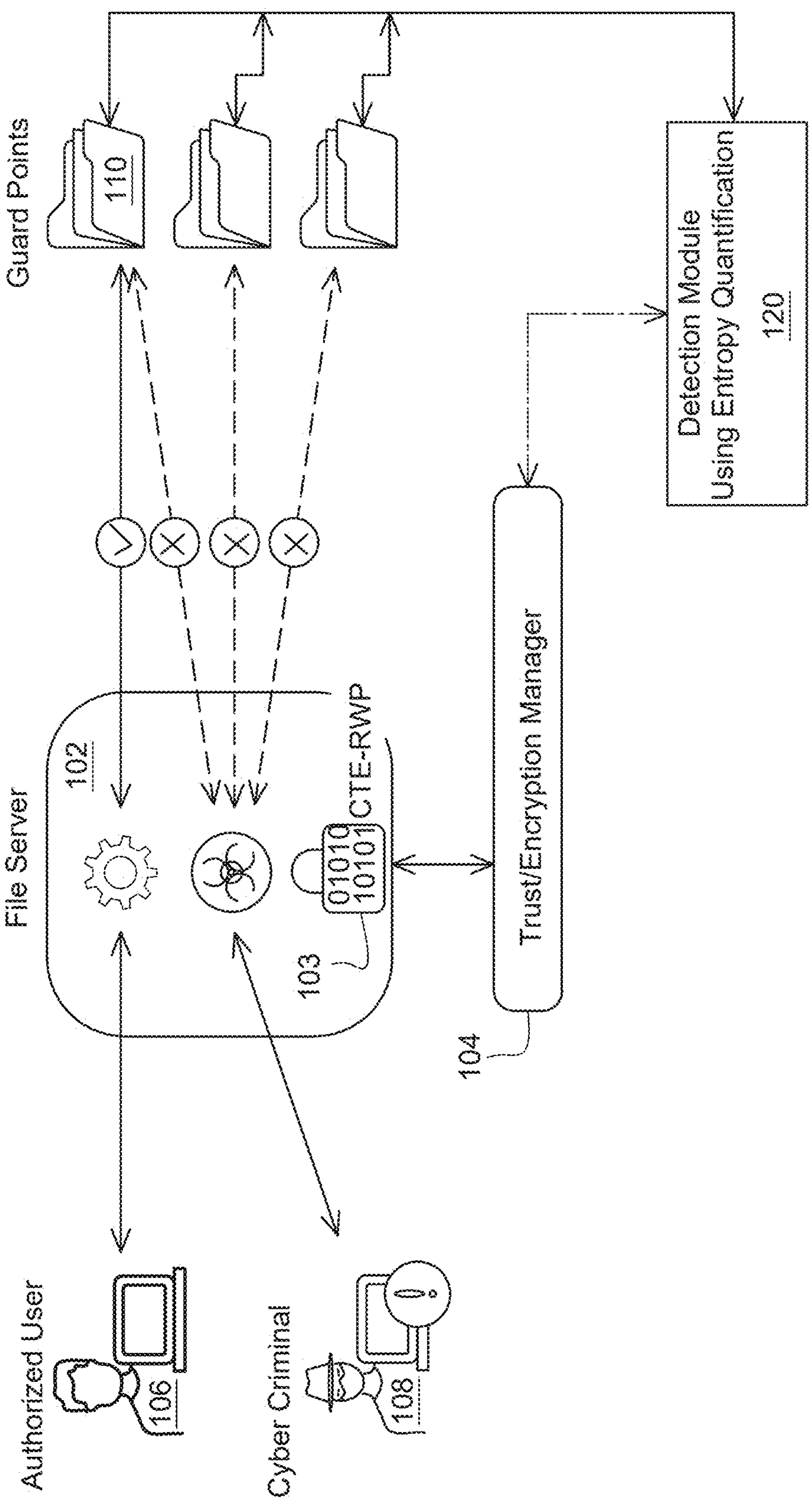
FIG. 1 illustrates a block diagram and flow of a system for preventing or mitigating malicious processes by performing a normalized entropy quantification calculation on data in accordance with the embodiments.

In some embodiments with reference to the system 100 of FIG. 1, the systems and methods herein provide for Ransomware (and other malicious code) protection in a non-intrusive way of protecting files/folders 110. The embodiments herein watch for abnormal I/O activity on files hosting data, and in some embodiments, business critical data. It allows administrators to alert/block suspicious activity before ransomware can take hold of the endpoints/servers 102 belonging to an entity.

Existing systems are inefficient and typically just use a signature based approach or a reverse engineering approach. Some solutions look for specific signatures, text or other indicator inside the file. Some solutions look for specific Ransomware texts. In yet other solutions logs are collected from the system to monitor the activity and analyze these logs to detect the malicious operations. In yet other existing solutions, a system collects the data and sends it to other servers for analysis. This technique is good for forensic analysis once the attack is over, but it doesn't protect the customer's data on live systems or systems where a rapid detection and response is desired.

The embodiments can provide near transparent data protection by continuously enforcing ransomware protection per volume with minimal configuration and no modification to any applications on the endpoint/server 102. The system can continuously monitor abnormal file activity caused by ransomware infected processes, and alerts/blocks when such an activity is detected before executing data in a live data stream.

Since the data protection embodiments can be embodied as a stand alone module 104 or as an adjunct module 120 coupled to an already existing module 104 as shown in the system 100 of FIG. 1, it enables administrators to start with ransomware or malware protection alone, without setting up restrictive access control and encryption policies on a per file/folder basis.

In some embodiments, the system (100) and method (400 or 500) can use process-based machine learning models to dynamically detect suspicious file I/O activity. It identifies and alerts or blocks ransomware or malware from cyber criminals 108 on the endpoints/servers 102. Approved processes by authorized users 106 can be added to a trusted list to bypass monitoring in certain embodiments.

The embodiments herein provide an adequate level of ransomware detection, without configuring detailed access control policies at a file/folder level on each endpoint/server. Combined with an encryption engine, administrators can additionally apply finer-grained access control and encryption. Fine-grained Access Control defines who (user/group) has rights to encrypt/decrypt/read/write or list-directory where business critical data resides and places strict access control policies around backup processes, including encrypting backups to prevent data exfiltration. The access control can also provide guard point level trusted list of files (binaries) that are approved to access and encrypt/decrypt protected folders including signature checks on trusted applications to ensure their integrity.

The embodiments herein enable detection and prevention of malicious processes from encrypting or destroying sensitive data and can stop exfiltration of sensitive data from internal or external threats. The system performs efficient and enhanced data analysis and protection for sensitive data by effectively understanding the process behavior commonly known in the malicious processes and identifying and blocking such processes before they are executed on the sensitive data. This is more efficient that having to rely on a database with signatures that need to be constantly updated or more efficient than using a reverse engineering technique.

Existing systems inefficiently look at databases for matching with existing signatures. In some instances, this is done after analyzing logs after data processing. In many instances, analyzing logs will be too late to prevent the damage intended by the malicious cyber criminal.

Instead, the embodiments safeguard the sensitive data against Ransomware or malware attacks by analyzing the process IO and data access pattern efficiently by collecting input and output data using a kernel driver and performing a normalized entropy quantization calculation on the data. In some embodiments, the system can run on data as a dispatch IRQ or interrupt request. In some embodiments, the code can be written at a dispatch level. Such a system preferably has the ability to analyze various data formats or types, compressed data, de-duped data, and with minimal or even without any false positives. In some embodiments, the system and methods can protect against polymorphic Read/Write attacks without signature database matching.

In other words, the systems and methods herein collect and analyze the application data with efficiency and accuracy with little effect on the application performance and functionality. Furthermore, such a system can provide a solution that is immune to any Advanced Persistent Threats (APT) or scripts.

The system can be used on different formats of data, whether encrypted or compressed or not. For example, the system can utilize the knowledge that most keys are length aligned, and more particularly, 16 bytes aligned. So anything that repeats in a run that is evenly divisible by 16 could likely still be an encrypted block of data even though it repeats. This enables the easy analysis of WinZip files to determine if the file is clear versus two other cases, where it's a WinZip (compression) of encrypted data or it's a WinZip (compression) of clear data. In other words, you can have a WinZip compressed file that is then encrypted or an encrypted file that is then compressed. Such files can be distinguished by looking at the WinZip compression screen itself and see if itself has repeated sequences to determine if its clear data. WinZip will also put a clear header before each run sequence of data, which the detection system discards as too low of entropy for any compressed stream. The technique above also applies to Base64 data.

Figure 2:
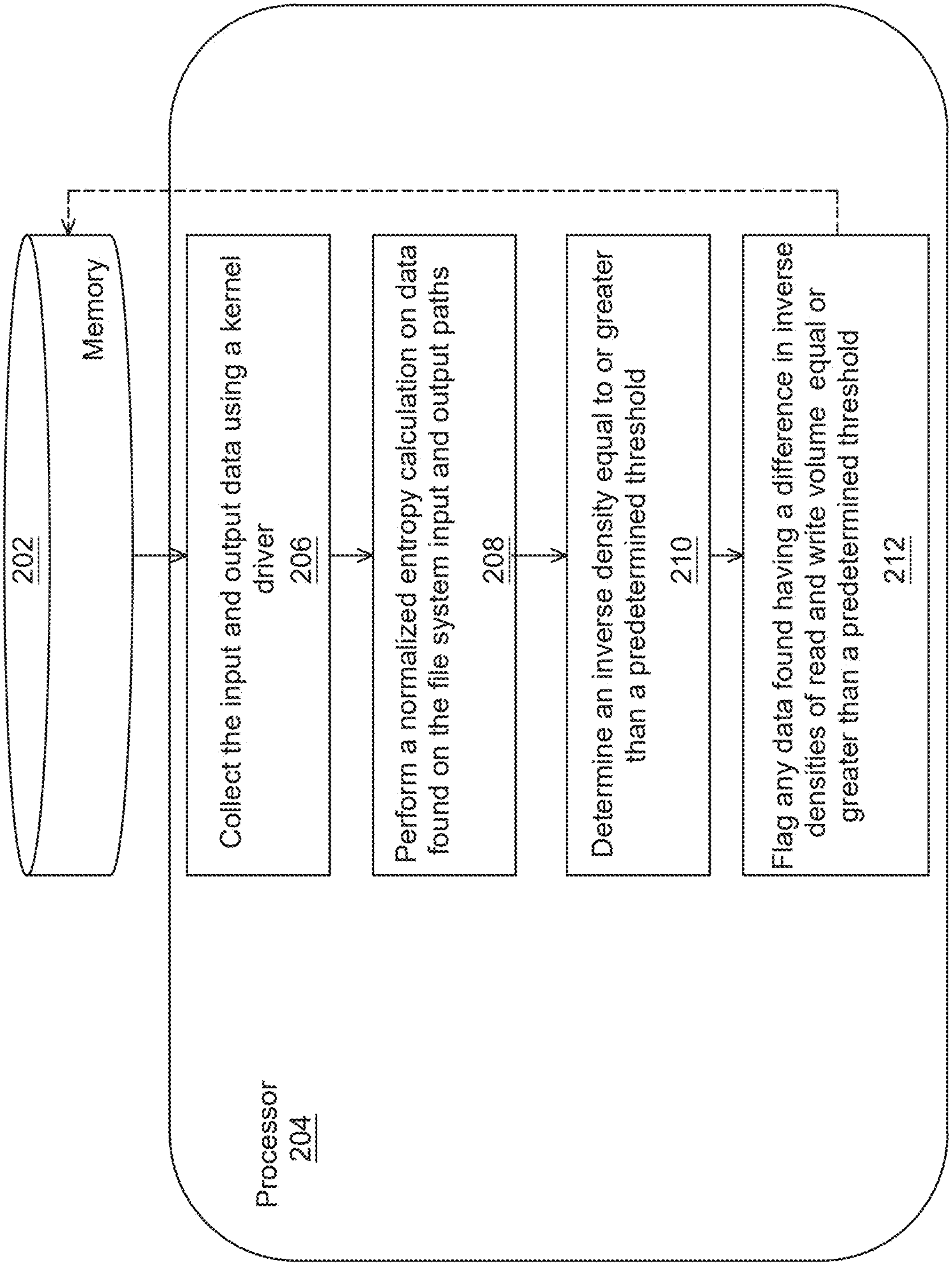
FIG. 2 illustrates another block diagram and flow of a system for preventing or mitigating malicious processes by performing a normalized entropy quantification calculation on data in accordance with the embodiments.

In some embodiments, with further reference to a method and system 200 as illustrated in FIG. 2, limited read and writes from a file in memory 202 can be initially analyzed by a processor 204. If desired, the data can be viewed in multiple slices or segments or alternatively an entire program can be analyzed. In some embodiments, the system can perform the steps as illustrating including collecting the input and output data using kernel driver at 206, performing a normalized entropy quantification calculation at 208 on the data found on the file system input and output paths, determining at 210 an inverse density equal to or greater than a predetermined threshold, and flagging any data found having a difference in inverse densities of read and write volume equal or greater than a predetermined threshold at 212.

The predetermined thresholds can be identified through experimental runs on data of various formats. Approximate values can be used and do not need to be absolute for any particular instance. In one series of experimental runs, for example, the Inverse Density Value ranges and their corresponding data type or format were as follows:

| Inverse Density Value | Data Type/Format |
|---|---|
| 0 to 6 | Encrypted |
| 6 to 10 | Compressed |
| 10 to 15 | Binary encoding (images, media, doc, ppt, etc.) |
| Above 15 | Text Data |

Furthermore, the system should look beyond an initial number of bytes because some ransomware may start encrypting further down on a file like 3K down into the file. The system also needs to account for highly compressed files such as Gzips which have high entropy and they have tiny headers.

For small Gzips, even the run link compression doesn't find any repeated run sequence of data further into the data. Because of that, it is likely a small gzip will have no repeated runs, but the system can tell if it's being encrypted based on looking at the header that has been correlated using a benchmark technique.

As noted above, existing malware or ransomware detection techniques are traditionally signature based using a database of known signatures. Such systems can not detect new malware or ransomware. Reverse engineering techniques that may also be used are very tedious and inefficient. The method of entropy quantification herein can be very efficient and effective and can certainly be combined in any number of combinations with existing techniques such as the signature based and reverse engineering approaches noted above. Entropy quantification can also be used with machine learning to iteratively improve the detection processes. In some embodiments, the methods and systems herein can include an algorithm to parameterize entropy differences in read and write data as an input or inputs to machine learning algorithms.

Figure 3A:
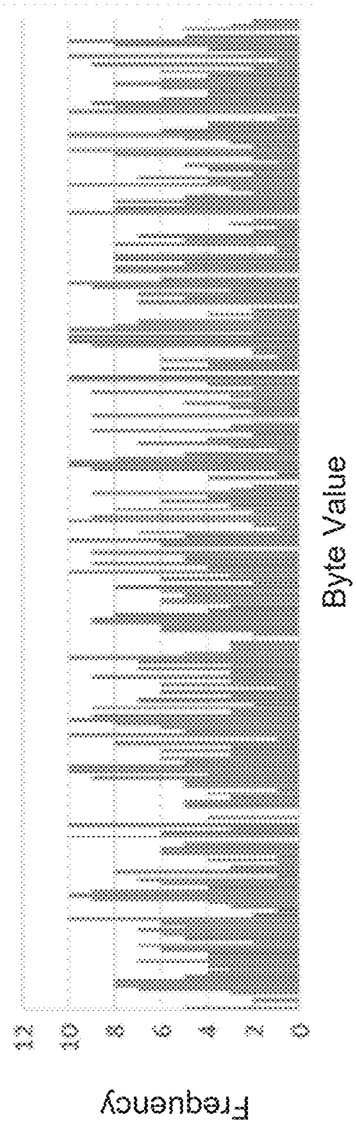
FIG. 3A illustrates a frequency distribution of byte values on input and output data in accordance with the embodiments.
Figure 3B:
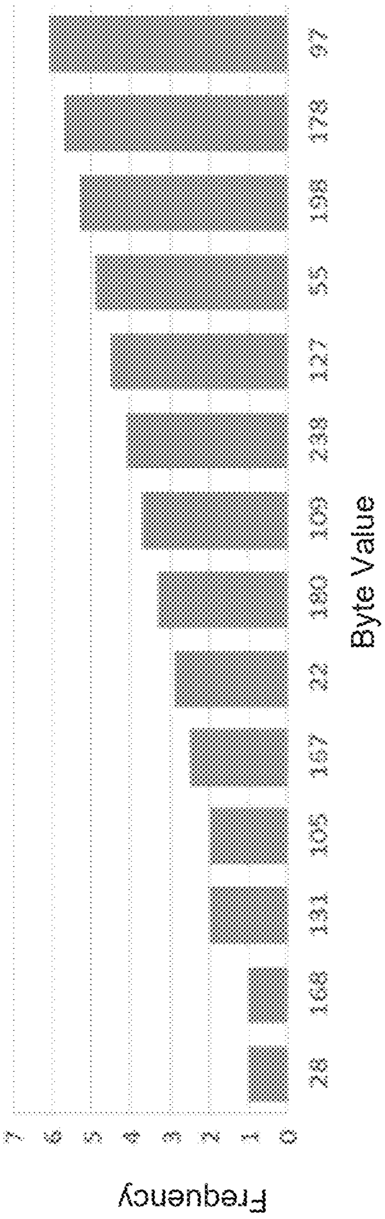
FIG. 3B illustrates a sorted frequency distribution of byte values on input and output data in accordance with the embodiments.
Figure 3C:
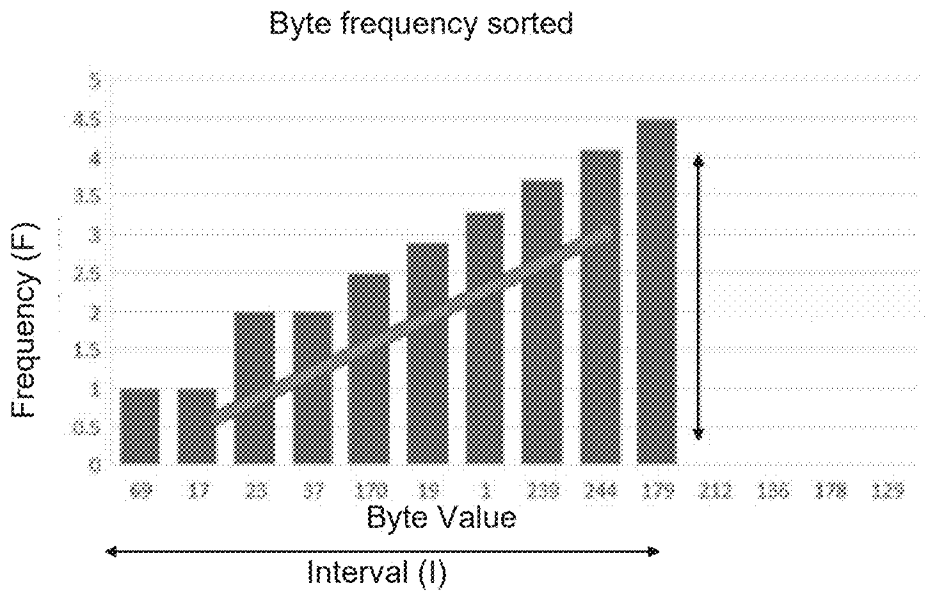
FIG. 3C illustrates a histogram of how the normalized entropy quantification is calculated in accordance with the embodiments.

With further reference to FIGS. 3A, 3B, and 3C, a normalized entropy calculation algorithm can measure deviations from an ideal fully random data of a same volume of data. The algorithm can be visually described as a sand jar metaphor where a frequency distribution of byte values on input/output data as shown in the chart 300 of FIG. 3A can be converted into separate data in bins of each alphabet, arranged in ascending order of frequency and where aggregate bins removing empty bins from sides and middle (sand dunes) form the sorted frequency distribution of byte values on input/output data as shown in the chart 302 of FIG. 3B.

Chart 350 of FIG. 3C illustrates a histogram of how the entropy is calculated including a legend where "H" is the height of the rectangle occupying the same volume as the frequency curve, also known as "ideal height". "I" is the number of bytes appearing at least once. "Fn" is the frequency of a given byte. The cumulative deviation or "CD" is the function CD=Sum (H−Fn). Mean deviation or "MD" is equal to CD/I. Finally, the Deviation percentage ("DP") or inverse density is calculated as DP=MD*100/H.

With reference to FIG. 3C, the method, in some embodiments, computes or calculates area of the curve under the distribution (volume of sand), finds the height of ideal (fully random) distribution occupying same area (shake the sand jar). Then, the method computes or calculates the absolute difference (deviation) from the ideal height at each point on the x-axis, computes or calculates a cumulative deviation and a mean deviation. Then, the method computes or calculates a percentage of a mean deviation by ideal height, which is called herein as "inverse density". The system can then flag any data found having a difference in inverse densities of read and write volume equal or greater than a predetermined threshold. Accordingly, a higher inverse density means that there is less random data (and therefore a higher likelihood of the existence of malicious code).

Figure 4:
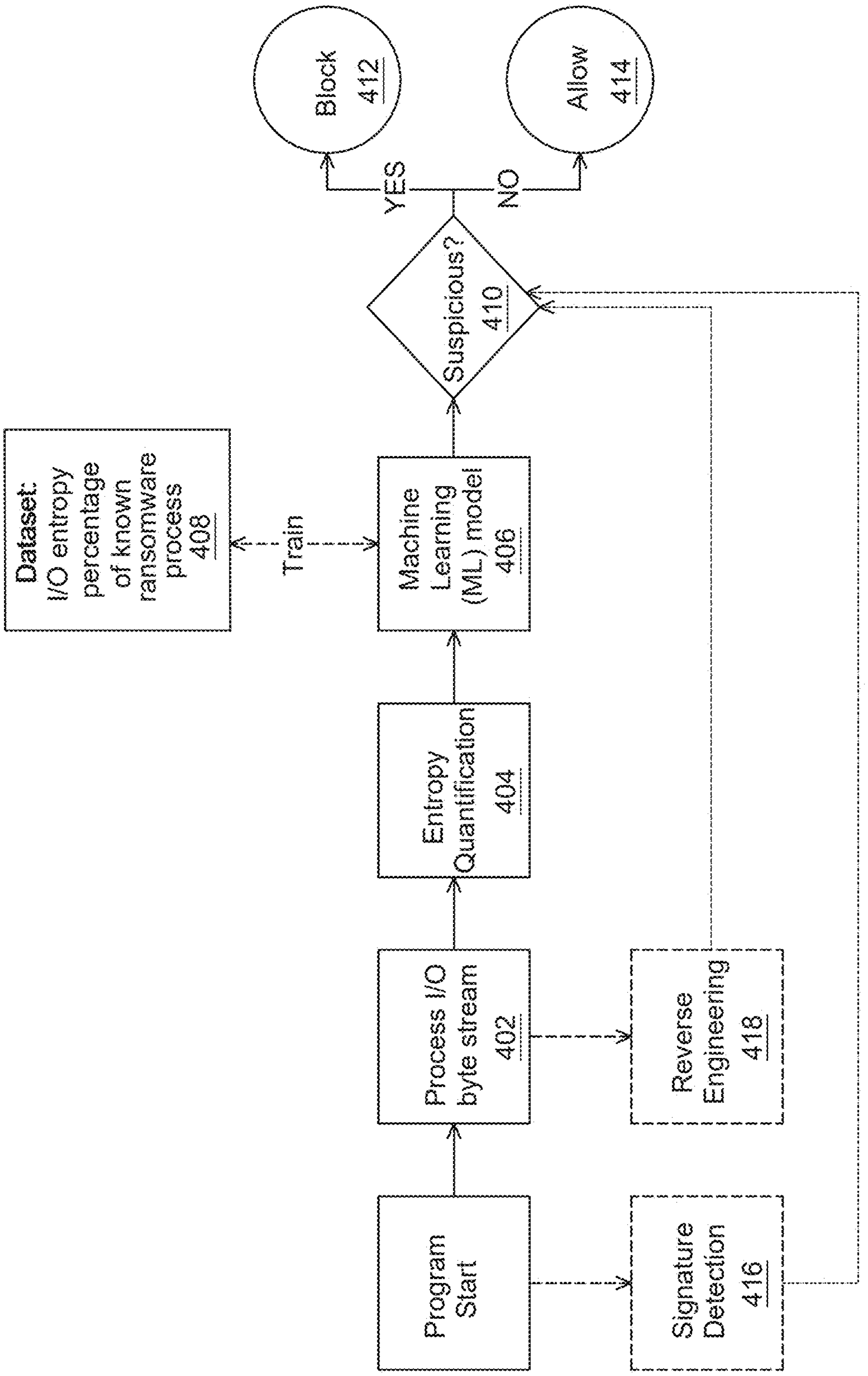
FIG. 4 illustrates a block diagram and flow chart of a system or method of preventing or mitigating malicious processes by performing a normalized entropy quantification calculation on data in accordance with the embodiments.

Referring to FIG. 4, a block diagram and method 400 illustrates how parameterization, training, and prediction for machine learning can be used to detect malicious code using the entropy quantification techniques herein. Optionally, the method 400 can be combined with signature detection 416 and reverse engineering 418 to provide an overall robust and efficient system.

The main entropy quantification algorithm portion of the method 400 can begin with the processing of an input/output (data) byte stream at 402 followed by the application of the entropy quantification algorithm at 404. The algorithm from 404 can be fed as an input to a machine learning model 406. The machine learning model 406 can be trained with a dataset at 408. The dataset can be known malware or ransomware process(es) or input and output entropy percentage of known malware or ransomware process(es). At decision block 410 after the machine learning model 406 is applied, the code is blocked at 412 if the machine learning model 406 determines that the code is suspicious and otherwise the code is cleared at 412 if the code is found not suspicious at decision block 410.

In some embodiments, the method 400 can also concurrently (or just before the main entropy quantification algorithm portion of the method) or independently perform the step of signature detection at 416, where an existing match of suspicious code can be easily and readily found at decision block 410 as explained above. The machine learning aspect can optionally provide some concurrence of the results. In some embodiments, the method 400 can concurrently or independently perform a reverse engineering process at 410. Again, the machine learning can optionally provide concurrence of the results. In yet other embodiments, all three aspects including the machine learning (408), the signature detection 416 and reverse engineering 418 can be performed to provide a thorough and robust detection system. It is anticipated that the machine model system alone can detect and capture the vast majority of suspicious code.

In some embodiments, the systems and methods disclosed herein can enhance the malware and ransomware detection capabilities of Thales Group's CipherTrust Encryption product (CTE) with faster and more accurate analysis.

Figure 5:
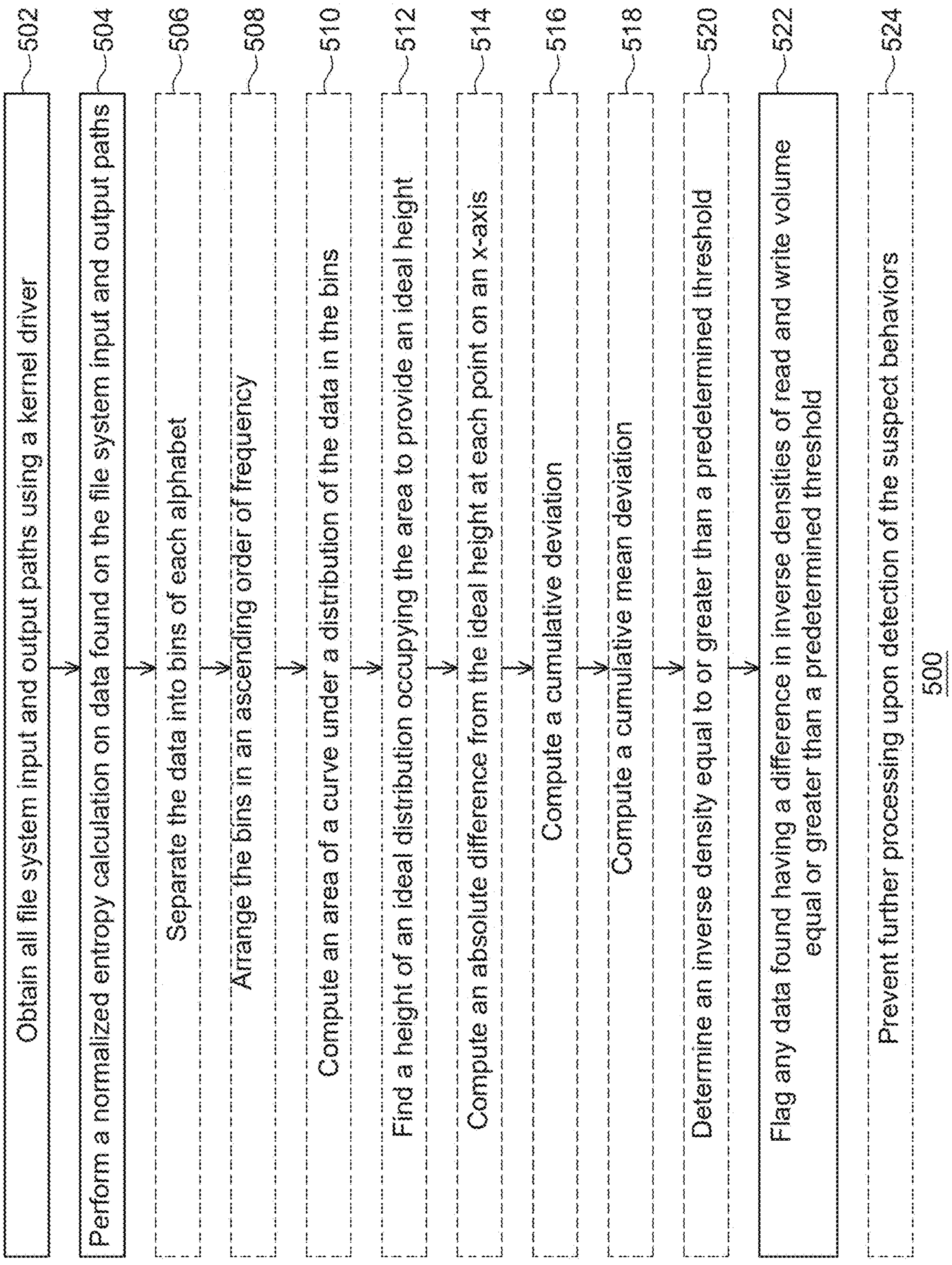
FIG. 5 is a flow chart illustrating a method for preventing or mitigating malicious processes by performing a normalized entropy quantification calculation on data in accordance with the embodiments.

Referring to FIG. 5, a method 500 for preventing or mitigating malicious processes can include the operations or steps of obtaining (502) all file system input and output paths using a kernel driver, performing (504) a normalized entropy quantification calculation on data found on the file system input and output paths, determining (520) an inverse density from the normalized entropy calculation, and flagging (522) any data or data segment found having a difference in inverse densities of read and write volume equal to or higher than a predetermined threshold.

In some embodiments, the step of performing the normalized entropy calculation 504 can include the steps of separating (506) the data into bins of each alphabet, arranging (508) the bins in an ascending order of frequency, computing an area of a curve under a distribution of the data in the bins at 510, finding a height of an ideal distribution occupying the area to provide an ideal height at 512, computing an absolute difference from the ideal height at each point on an X-axis at 514, computing at 516 a cumulative deviation, computing at 518 a cumulative mean deviation, and computing a percentage mean deviation by ideal height to provide the inverse density at 520. As noted above, any data found having a difference in inverse densities of read and write volume equal or greater than a predetermined threshold can be flagged at 522. If flagged, then the method 500 can prevent further processing upon such detection of suspect behavior (suspected malicious code) at 524.

In summary, the methods and systems herein can run an analysis on data being or intended to be read or written by an application with great efficiency and with minimal or no false positives with accuracy. Although not necessarily limited to ransomware, embodiments are ideally suited for detecting ransomware activities such as excessive data access, exfiltration, encryption, data destructions or impersonation with malicious actions.

The systems and methods herein can monitor active processes rather than relying on a database of known ransomware file signatures. Incredibly, the system, in certain embodiments, can defend against ransomware even when the ransomware is already installed prior to this solution. In other words, the embodiments herein can detect ransomware that is lying in wait.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computing device for detecting and preventing or mitigating malicious processes in a computing environment, the computing device comprising:

one or more processors and memory operatively coupled to the one or more processors, wherein the memory includes computer instructions which when executed by the one or more processors causes the one or more processors to perform the operations of:

obtain all file system input and output paths using a kernel-level driver;

monitor, at run time by an anomaly-based file system monitor implemented in the kernel-level driver, file system read and write operations issued by executing processes, comprising data conveyed on input and output paths of the file system, as run-time behavioral data of the executing processes;

perform in real time a normalized entropy quantification calculation on content-based bytes of data read from and written to the file system by the executing processes found on the input and output paths to characterize run-time file transformation behavior;

determine an inverse density from the normalized quantification entropy calculation by separating the bytes into bins corresponding to each symbol of a fixed alphabet;

arranging the bins in an ascending order of frequency;

computing an area under a distribution curve defined by the arranged bins;

determining an ideal height of an idealized uniform distribution occupying the computed area:

computing an absolute difference between the distribution curve and the ideal height at each point along an X-axis;

computing a cumulative deviation based on the absolute differences;

computing a cumulative mean deviation from the cumulative deviation; and computing a percentage of the cumulative mean deviation relative to the ideal height to produce the inverse density; and flag an executing process as malicious when a difference between inverse densities computed for bytes associated with read operations and bytes associated with write operations exceeds a predetermined threshold indicative of anomalous file transformation behavior.

2. The computing device of claim 1, wherein the malicious processes comprise ransomware or malware.

3. The computing device of claim 1, wherein for detecting, further uses a machine learning process including parametrization of data, training with known benign programs and known malicious processes, and uses machine learning algorithms for prediction of run time behavior of a process to refine the detecting of malicious processes by providing the inverse density and additional run-time behavioral features of the executing process as inputs to one or more machine learning models configured to predict expected run-time behavior of the executing process; and determining, based on an output of the one or more machine learning models, whether observed run-time behavior of the executing process deviates from predicted run-time behavior beyond an acceptable tolerance, thereby, flagging the executing process as malicious when the deviation between the observed run-time behavior and the predicted run-time behavior exceeds the predetermined threshold.

4. The computing device of claim 3, wherein for detecting, maintains at run time a set of behavioral metrics for the executing process's input/output behavior, the set comprising the inverse density derived from content-based entropy quantification of file system reads and write data bytes, ratio of read volume to write volume associated with the executing process to reduce false positives, and a count of detected data mutations associated with file write operations.

5. The computing device of claim 4, wherein for detecting, further computes at run time ratios of inverse densities and file system read and write volumes associated with the executing process and provides the computed ratios and the count of detected data mutations as parametric inputs to the one or more machine learning models.

6. The computing device of claim 3, wherein for detecting, further trains the machine learning system with benign programs and malicious processes including simulated processes and real processes.

7. The computing device of claim 3, wherein the machine learning system marks a process as either suspect or benign.

8. The computing device of claim 3, wherein the machine learning system further accrues behavior corresponding to a process for a certain threshold and declares the process malicious upon crossing the threshold.

9. A system for detecting and preventing or mitigating malicious processes in a computing environment, comprising:

one or more processors and memory operatively coupled to the one or more processors, wherein the memory includes computer instructions which when executed by the one or more processors causes the one or more processors to perform the operations of:

obtain all file system input and output paths using a kernel-level driver;

monitor, at run time by an anomaly-based file system monitor implemented in the kernel-level driver, file system read and write operations issued by executing processes, comprising data conveyed on input and output paths of the file system, as run-time behavioral data of the executing processes;

perform in real time a normalized entropy quantification calculation on content-based bytes of data read from and written to found on the file system by the executing processes found on the input and output paths to characterize run-time file transformation behavior;

determine an inverse density from the normalized quantification entropy calculation by separating the bytes of data into bins corresponding to each symbol of a fixed alphabet;

arranging the bins in an ascending order of frequency;

computing an area under a distribution curve defined by the arranged bins;

determining a height of an ideal distribution occupying the area computed to provide an ideal height;

computing an absolute difference between the distribution curve and the ideal height at each point along an X-axis;

computing a cumulative deviation based on the absolute difference;

computing a cumulative mean deviation from the cumulative deviation; and computing a percentage of the cumulative mean deviation relative to the ideal height to produce the inverse density; and flag an executing process as malicious when a difference between inverse densities computed for bytes associated with read operations and bytes associated with write operations exceeds a predetermined threshold indicative of anomalous file transformation behavior.

10. A method for detecting and preventing or mitigating malicious processes in a computing environment using one or more processors and memory operatively coupled to the one or more processors, wherein the memory includes computer instructions which when executed by the one or more processors causes the one or more processors to perform the operations of:

obtaining all file system input and output paths using a kernel-level driver;

monitoring, at run time by an anomaly-based file system monitor implemented in the kernel-level driver, file system read and write operations issued by executing processes, comprising data conveyed on input and output paths of the file system, as run-time behavioral data of the executing processes:

performing in real time a normalized entropy quantification calculation on content-based bytes of data read from and written to the file system by the executing processes found on the input and output paths to characterize run-time file transformation behavior;

determining an inverse density from the normalized entropy calculation by separating the bytes into bins corresponding to each symbol of a fixed alphabet:

arranging the bins in an ascending order of frequency;

computing an area under a distribution curve defined by the arranged bins;

determining an ideal height of an idealized uniform distribution occupying the computed area;

computing an absolute difference between the distribution curve and the ideal height at each point along an X-axis:

computing a cumulative deviation based on the absolute differences:

computing a cumulative mean deviation from the cumulative deviation; and computing a percentage of the cumulative mean deviation relative to the ideal height to produce the inverse density; and flagging an executing process as malicious when a difference between inverse densities computed for bytes associated with read operations and bytes associated with write operations exceeds a predetermined threshold indicative of anomalous file transformation behavior.

11. The method of claim 10, further uses a machine learning process for parametrization of data, training with known benign programs and known malicious processes, and uses machine learning algorithms for prediction of run time behavior of a process to refine the detecting of malicious processes by:

providing the inverse density and additional run-time behavioral features of the executing process as inputs to one or more machine learning models configured to predict expected run-time behavior of the executing process; and determining, based on an output of the one or more machine learning models, whether observed run-time behavior of the executing process deviates from predicted run-time behavior beyond an acceptable tolerance, thereby, flagging the executing process as malicious when the deviation between the observed run-time behavior and the predicted run-time behavior exceeds the predetermined threshold.

12. The method of claim 11, further includes the step of performing one or more of a signature-based comparison and reverse engineering analysis in addition to the machine learning process.

* * * * *